United States Patent
Reay

(10) Patent No.: US 6,614,007 B1
(45) Date of Patent: Sep. 2, 2003

(54) GRIDDLE PLATE WITH INFRARED HEATING ELEMENT

(75) Inventor: Malcolm Reay, Drums, PA (US)

(73) Assignee: The Garland Group, Freeland, PA (US)

(*) Notice: Subject to any disclaimer, the term of this patent is extended or adjusted under 35 U.S.C. 154(b) by 280 days.

(21) Appl. No.: 09/251,833

(22) Filed: Feb. 17, 1999

(51) Int. Cl.[7] ............................................. H05B 3/68
(52) U.S. Cl. ................................................. 219/460.1
(58) Field of Search ........................ 219/449.4, 450.1, 219/451.1, 460.1, 461.1, 465.1, 467.1, 468.2; 99/349, 350, 351, 378, 379, 422

(56) References Cited

U.S. PATENT DOCUMENTS

| | | | |
|---|---|---|---|
| 1,051,967 A | * 2/1913 | Person ..................... 219/460.1 |
| 1,112,582 A | * 10/1914 | Whittlesey ............... 219/450.1 |
| 1,711,472 A | * 4/1929 | Lewin ...................... 219/460.1 |
| 2,632,379 A | 3/1953 | Kudo |
| 3,010,383 A | 11/1961 | Greene |
| 3,231,718 A | * 1/1966 | Vasile ...................... 219/450.1 |
| 3,317,709 A | * 5/1967 | Beasley ................... 219/450.1 |
| 3,528,361 A | 9/1970 | LeVan |
| 3,833,793 A | * 9/1974 | McWilliams et al. .... 219/460.1 |
| 3,843,315 A | 10/1974 | Sorensen |
| 4,788,414 A | * 11/1988 | Schreder .................. 219/460.1 |
| 4,816,647 A | * 3/1989 | Payne ...................... 219/460.1 |
| 4,838,153 A | 6/1989 | Escamilla et al. |
| RE32,994 E | 7/1989 | Adamson et al. |
| 4,852,545 A | 8/1989 | Sherman et al. |
| 4,913,040 A | 4/1990 | Sherman et al. |
| 5,181,455 A | 1/1993 | Masel et al. |
| 5,197,377 A | 3/1993 | Jennings et al. |
| 5,223,290 A | 6/1993 | Alden |
| 5,341,727 A | 8/1994 | Dickson |
| 5,517,002 A | * 5/1996 | Higgins ................... 219/460.1 |
| 5,532,458 A | * 7/1996 | Kratel et al. ............. 219/460.1 |
| 5,640,895 A | 6/1997 | Anetsberger |

* cited by examiner

Primary Examiner—Sang Paik
(74) Attorney, Agent, or Firm—Ohlandt, Greeley, Ruggiero & Perle, LLP

(57) ABSTRACT

A cooking appliance for grilling food products has a griddle plate and a heating assembly that contains a non-contact infrared heating element to achieve uniform plate temperatures, fast initial warming times and fast recovery times. The heating element is situated in a cavity formed by thermal insulating material in the assembly. When the assembly is secured to the griddle plate, there is a space between the heater element and the griddle plate to allow infrared radiation heat transfer to heat the griddle plate. The insulating material has a relatively high insulating factor so as to minimize heat loss and reduce energy usage.

16 Claims, 4 Drawing Sheets

US 6,614,007 B1

GRIDDLE PLATE WITH INFRARED HEATING ELEMENT

FIELD OF INVENTION

This invention relates to cooking equipment and in particular to a cooking appliance that includes a griddle plate for grilling food products such as meat patties, eggs, bacon, sausage links, potatoes and the like.

BACKGROUND OF INVENTION

Conventional griddle plates are made from steel or cast iron and are heated by means of tubular sheathed elements as, for example, disclosed in U.S. Pat. No. 3,843,315. The heating elements are maintained in contact with the underside of the griddle plate by a clamping system to maximize heat transfer and prevent over heating of the heating elements. The clamping system involves a substantial and often complex metal fabrication that adds cost and weight to the cooking appliance. The clamping system is secured to the griddle plate by a rather large number of studs that are screwed into holes or welded on to the griddle plate. This also adds cost and weight to the cooking appliance.

Another disadvantage of the conventional griddle plate heating system is that upon initial warming and heat recovery after placement of cool food products on the griddle, there is more heat transfer at the points of heating element contact than at other areas of the griddle plate. This leads to uneven griddle plate cooking surface temperatures. An uneven cooking surface temperature, in the form of localized hot and cool spots, affects the quality of the food products being grilled.

A thermal insulating material is used below the heating elements to maintain efficient heat transfer and prevent heat from affecting nearby components, controls or structures. The insulating material, if not contained, can be an environmental hazard to users of the cooking appliance. A container for the insulation is an added cost.

The present invention provides an improved cooking appliance that is relatively simple in construction and inexpensive to manufacture versus the heavy, labor intensive grills of the prior art.

Moreover, the present invention provides an improved cooking appliance that provides a uniform distribution of heat over the entire surface of a griddle plate which overcomes the uneven heat distribution associated with the heating elements used in conventional grills.

SUMMARY OF INVENTION

A cooking appliance according to the present invention comprises a heating assembly for heating a griddle plate. The heating assembly includes a non-contact infrared heating element disposed within the assembly such that there is a space between the heating element and the griddle plate.

In other embodiments according to the present invention, the heating assembly includes a container having a cavity with the heating element being disposed within the cavity. Preferably, the cavity is formed by thermal insulating material. The container is formed of a base and a wall.

In one preferred embodiment according to the invention, the infrared heating element is secured to the insulating material by staples.

In another embodiment according to the present invention, the cooking appliance includes a lower platen and a positioning mechanism, each mounted to a housing. An upper platen is mounted to the positioning mechanism. The positioning mechanism is operable to move the upper platen between a cooking and a non-cooking position with respect to the lower platen. A heating assembly is provided to heat the lower platen. The heating assembly includes a non-contact infrared heating element disposed within the assembly such that there is a space between the heating element and the lower platen.

BRIEF DESCRIPTION OF DRAWINGS

Other and further embodiments, advantages and features of the present invention will be understood by reference to the following specification in conjunction with the accompanying drawings, in which like reference characters denote like elements of structure and.

DESCRIPTION OF PREFERRED EMBODIMENT

Figure 1:
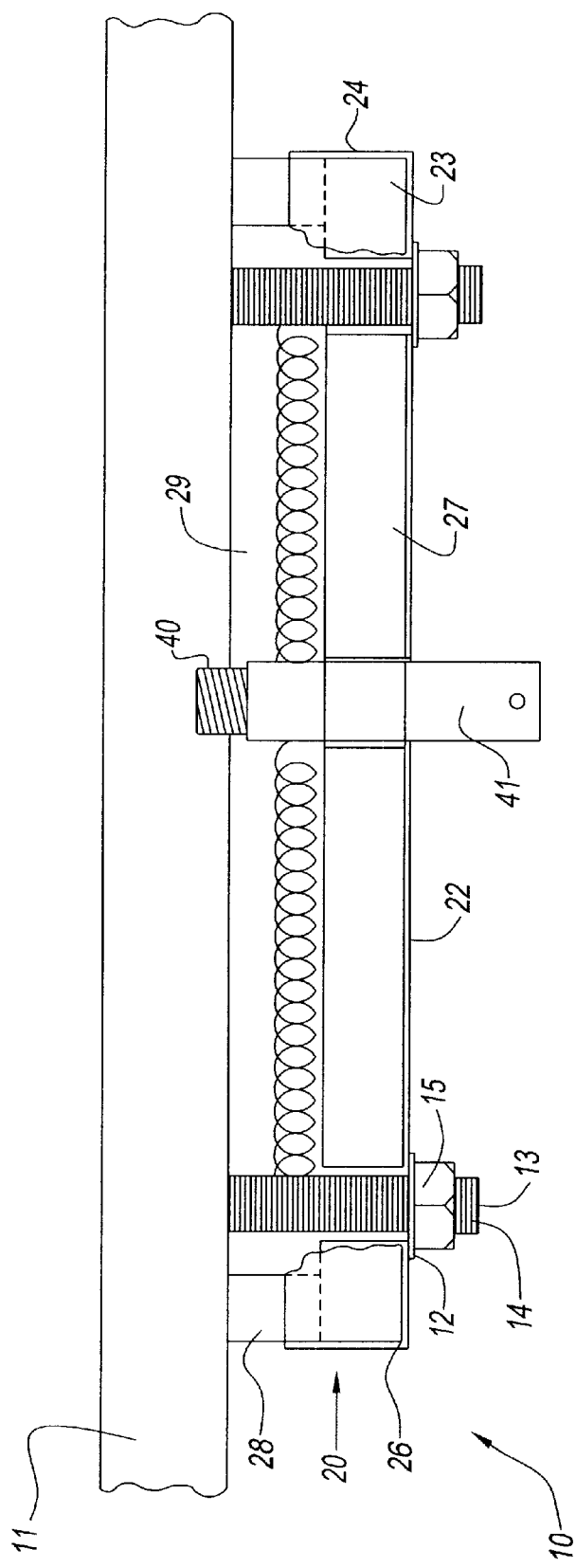
FIG. 1 is an elevational view, in part, and a cross-sectional side view, in part, of a cooking appliance according to the present invention.
Figure 2:
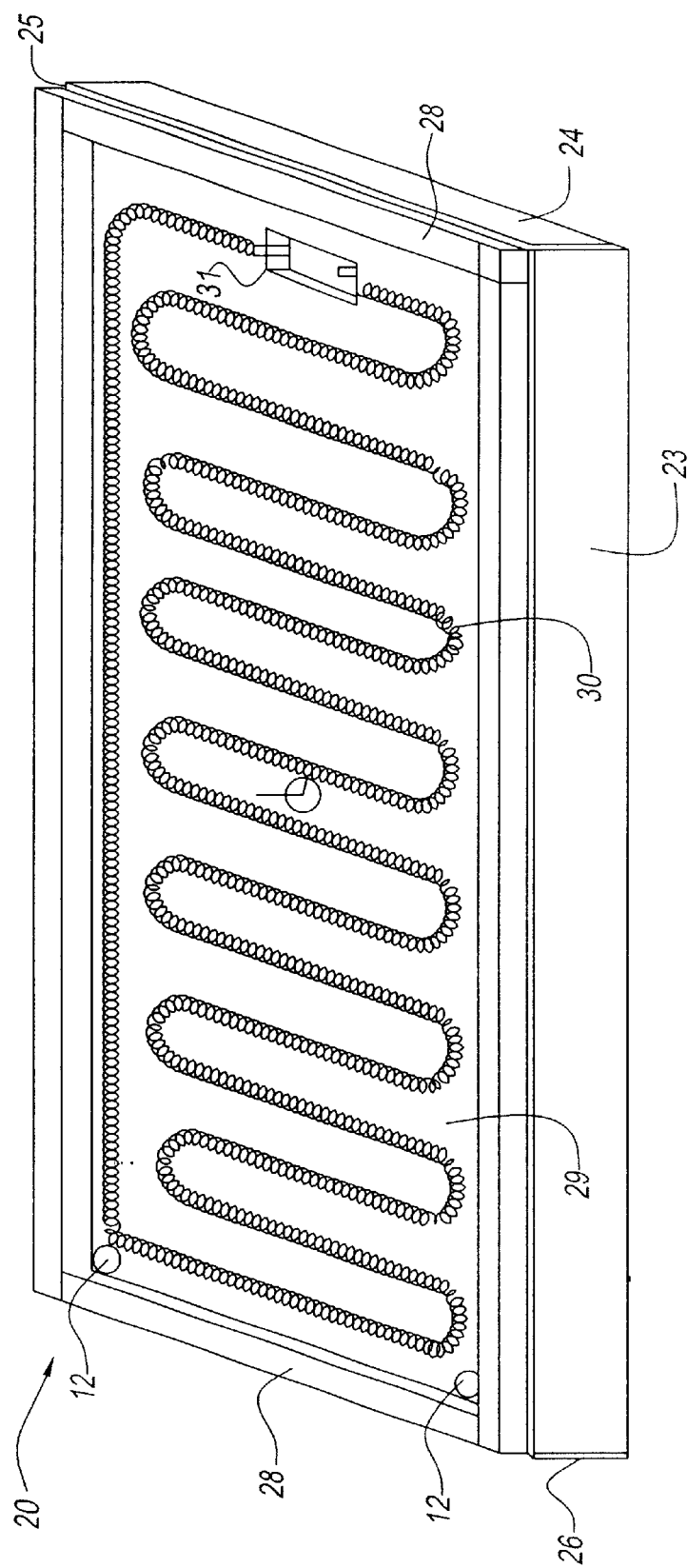
FIG. 2 is a perspective top front view of the heating assembly of the cooking appliance of FIG. 1.

With reference to FIGS. 1 and 2, there is provided a cooking appliance according to the present invention, generally represented by numeral 10. Cooking appliance 10 has a griddle plate 11 that is heated by a heating assembly 20.

Griddle plate 11 is a conventional griddle plate that is made of a suitable metal, such as steel or cast iron. Griddle plate 11 is useful, for example, to cook grilled food products such as, meat, poultry, or fish products, potatoes or other vegetables, sandwiches, bakery products and the like.

Heating assembly 20 includes a container 21 and a non-contact heating element 30. Container 21 may have any suitable shape that fits in form and heat transfer function with griddle plate 11. In a preferred embodiment, container 21 has a box shape that includes a base or bottom 22, and four side walls 23, 24, 25 and 26.

Thermal insulating material is disposed at least partly within container 21 and is shaped to form a cavity 29. Heating element 30 is situated within cavity 29. Cavity 29 has a depth that is great enough to allow a space between the top of heating element 30 and the bottom of griddle plate 11.

The insulating material is shown in FIGS. 1 and 2 as comprising layers 27 and 28 of insulation. Insulating layer 27 is disposed to sit on the inside surface of bottom 22. Insulating layer 28 is seated against the inside surfaces of side walls 23 through 26 and sits on top of insulating layer 27. Insulating layer 28 can alternatively be formed about the periphery of insulating layer 27 and adjacent side walls 23 through 26. Still another alternative is that insulating layers 27 and 28 can be formed as a one piece structure that defines cavity 29. Insulating layer 28 extends above side walls 23 through 26 by a sufficient amount to allow the aforementioned space between the top of heating element 30 and the bottom of griddle plate 11.

Heating assembly 20 is secured to griddle plate 11 by means of four screw fasteners 12 arranged about the periphery of container 21, preferably at the corners. Each screw fastener 12 has a stud 13 with screw threads 14 and a mating nut 15. Stud 13 is anchored in the bottom of griddle plate 11. Stud 15 extends through container 21 and its bottom 22.

When screwed on stud 13, nut 15 secures heating assembly 21 snugly against the bottom surface of griddle plate 11.

Heating element 30 is any suitable non-contact heating coil that, when energized with electric current, emits infrared radiation and that can be arranged in a pattern that covers a substantial area under griddle plate 11. Preferably, heating element 30 is a coil that is arranged in a serpentine manner on top of insulating layer 27. Infrared heating element 30 is dimensioned to emit infrared radiation in the wavelength range of about 900 to 4,000 nanometers (nm).

Heating element 30 may suitably be model Rage 3 available from Wiegand Appliance of Vernon, Alabama. Heater element 30 is electrically connected at its ends to a connector block 31. Connector block 31 is situated in bottom 22 and has industry standard connections (not shown) to the outside of container 21 for receiving electric current.

Insulating layers 27 and 28 may be any suitable thermal insulating material having a density that permits heating element 30 to be attached to layer 27 by suitable fasteners, such as staples, and a relatively high insulating factor so as to limit heat transfer through container 21, thereby maximizing heat transfer from heating element 30 to griddle plate 11. Insulating layers 27 and 28 may suitably be a microporous insulation.

When electricity is supplied via connector block 31 to heater element 30, heater element 30 has a fast heat up time to its operating temperature (within about ten seconds), glowing very brightly and emitting infrared radiation in all directions. The fast heat up time of heating element 30 the initial heating time and the recovery time of griddle plate 11 is significantly higher than with the conventional clamp on contact heating elements. With the serpentine distribution of heating element 30 and insulating material 27 and 28 minimizing heat loss, a very even transfer of heat takes place to provide a very uniform temperature in griddle plate 11. Also, the high insulating factor of insulating material 27 and 28 and the fast heat up time results in lower energy usage for similar cooking tasks.

A heat sensor (not shown), such as a thermocouple, may be embedded in a hole 40 in the bottom of griddle plate 11. For this purpose a mounting adapter 41 is provided that screws into hole 40. Mounting adapter 41 shields the heat sensor sheath from the infrared radiation and provides a means to mount the heat sensor. Mounting adapter 41 extends through insulating layer 27 and container bottom 22 to the outside for electrical connection to a temperature control system to maintain a desired cooking temperature of griddle plate 11.

Figure 3:
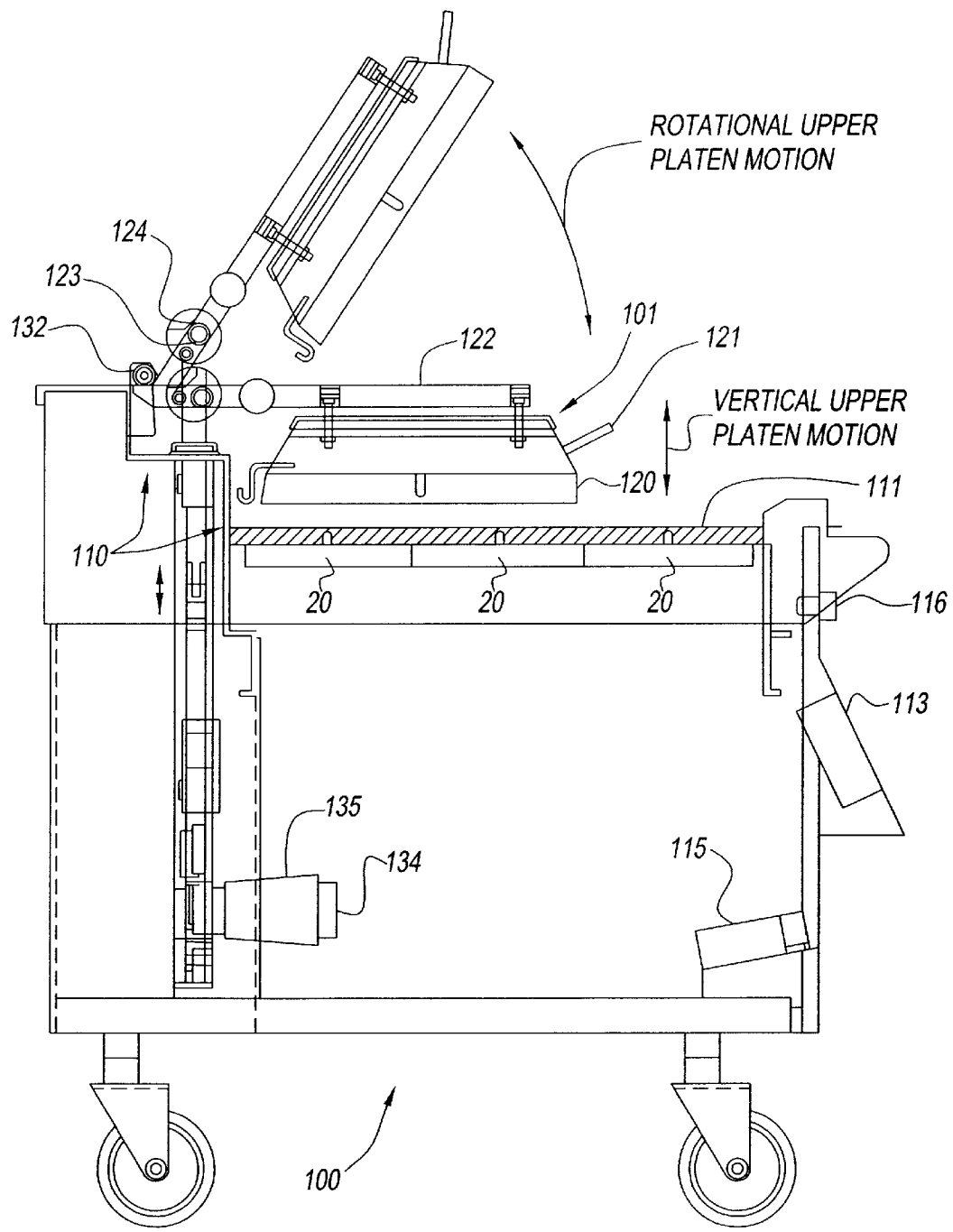
FIG. 3 is a side elevational view of a clam shell grilling cooking appliance embodiment of the present invention.
Figure 4:
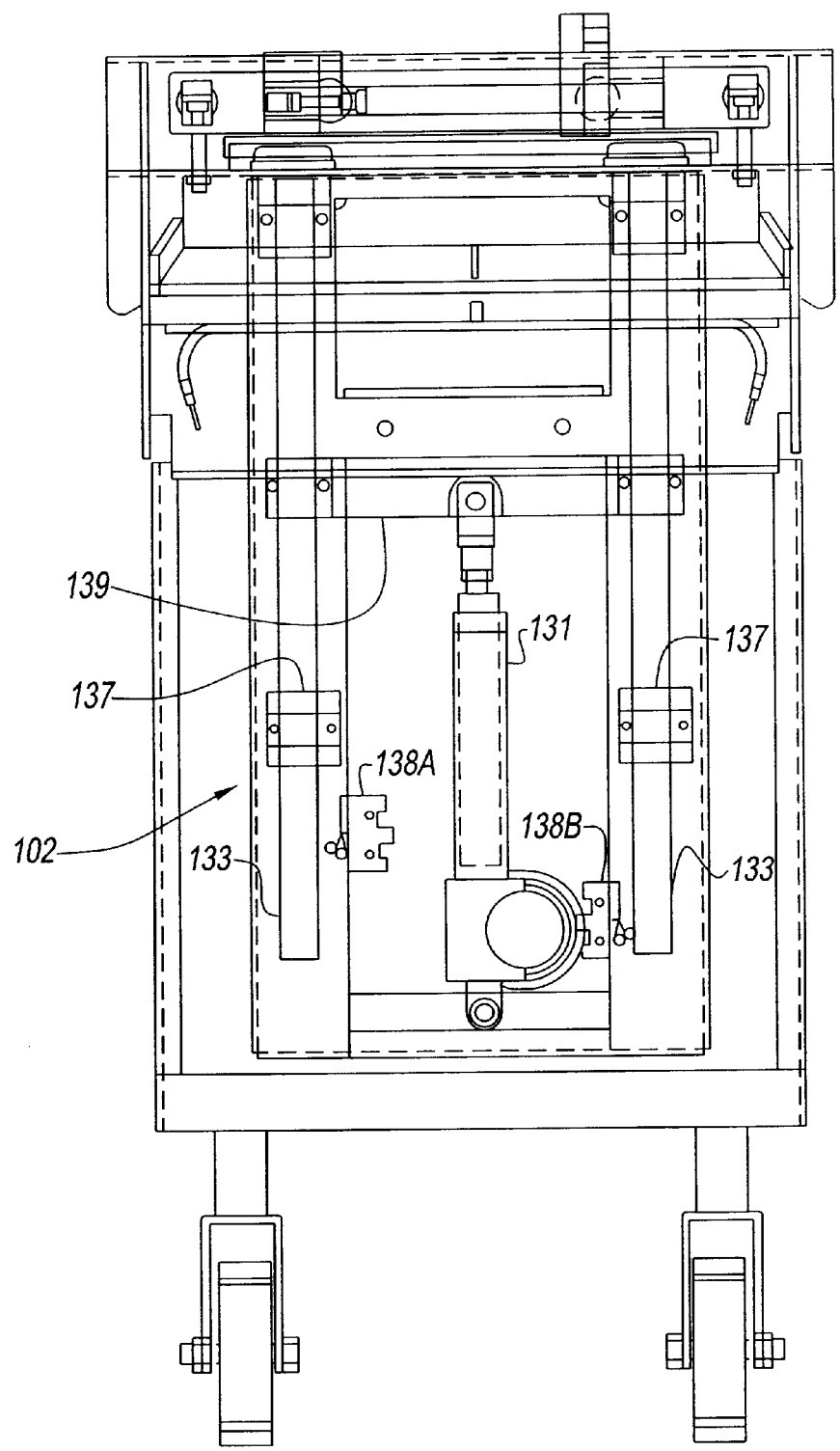
FIG. 4 is a rear schematic view of FIG. 3.

In a preferred embodiment according to the present invention the cooking appliance is a clam shell grill or two-surfaced cooking apparatus 100. Clam shell grill 100 comprises a support structure 110 to which a lower cooking platen or griddle plate 111 is horizontally mounted. Lower platen 111 has a smooth level cooking surface on its upper side. One or more heating assemblies 20 are mounted to the under side of lower platen 111 to heat lower platen 111 to a cooking temperature. In this embodiment, lower platen 111 is of a substantial dimension, for example two feet by three feet, to accommodate large numbers of food items at once. A total of three heating assemblies 20 are shown in FIG. 3 for such a large lower platen 111.

An upper platen assembly 101 is movably mounted to the rear of support structure 110 by means of a positioning mechanism 102. Upper platen assembly 101 comprises an upper cooking platen 120 heated to a cooking temperature by heating elements mounted within a casing. For example, upper cooking platen 120 may be a metallic plate heated by one or more infrared heating assemblies, such as assembly 20 of FIGS. 1 and 2. Upper cooking platen 120 is either smaller than or equivalently sized to lower cooking platen 111. Upper platen 120 has a handle 121 mounted on its front side for manual manipulation of upper platen assembly 101. In a preferred embodiment, two separate upper platen assemblies are mounted over a single lower platen, allowing for greater flexibility for the cook/operator.

Positioning mechanism 102 may be any suitable positioning mechanism that is operable to move upper platen 120 between a cooking position and a non-cooking position with respect to lower platen 111. Preferably, positioning mechanism 102 is of the type that facilitates two distinct motions by upper platen 120 from its uppermost position to a cooking position. This motion can be achieved by a number of different mechanisms as is appreciated by those skilled in the art.

By way of example, positioning mechanism 102 comprises a linear actuator 131 that is linked to two vertical reciprocating shafts 133 by an actuator cross bar linkage 139. Actuator cross bar linkage 139 is damped to vertical reciprocating shafts 133 which run through linear motion bearings 137. Vertical reciprocating shafts 133 are affixed to arm pivot/stop heads 124. Cantilever bars 122 run through arm pivot/stop heads 124 through rotational pivot bearings 123. When upper platen 120 is in its uppermost rotational position (see FIG. 3), linear actuator 131 is extended to its maximum position, vertical reciprocating shafts 133 and arm pivot/stop heads 124 are extended upward and to a position which forces the back end of cantilever bars 122 to contact rotational bearing 132 forcing rotational motion of upper platen 120 to an angle of approximately 54° from the horizontal. When linear actuator motion is reversed, upper platen 120 descends both vertically and through an arc caused by the cantilever weight of upper platen 120 maintaining contact between rotational bearing 132 and back of cantilever bars 122. When cantilever bars 122 and upper platen 120 become parallel with lower platen 111, the stop portion of arm pivot/stop head 124 stops the rotational motion of cantilever bars 122 causing purely vertical motion of upper platen 120 from this point and further down to any of the cooking positions.

The linear actuator assembly comprises a drive motor 135, linear actuator 131, two substantially vertical reciprocating shafts 133 and upper is and lower position sensor switches 138A and 138B. Linear actuator 131, when activated, moves upper platen 120 vertically while the cantilever weight of upper platen 120 maintains contact between arm pivot/stop head 124 until the back of cantilever bar 122 makes contact with rotational bearing 132. This movement ensures that upper platen 120 is constantly parallel to lower platen 111 during this stage of upper platen travel. Once cantilever bar 122 makes contact with rotational bearing 132, the vertical motion is changed to rotational motion to a point where upper platen 120 is raised to the point at which upper position sensor switch 138A is set (approximately 54° above horizontal). An audible signal is sounded five seconds prior to the start of upward platen movement to alert the operator of impending upper platen movement. When a pair of activation buttons 16 are depressed simultaneously to start a cooking cycle, an user interface controller 113 sends information to a motor position controller 115. This information is used by motor position controller 115 to activate linear drive motor 135. The action of the rotational motion of linear drive motor 135 causes electrical pulses to be generated by positioning pulse encoder 134. The pulses generated by positioning pulse encoder 134 are received by motor position controller 115. This information and the activation of lower position sensor switch 138B allows motor controller 115 to accurately position the entire drive system to a predetermined upper platen position for cooking.

The present invention having been thus described with particular reference to the preferred forms thereof, it will be obvious that various changes and modifications may be made therein without departing from the spirit and scope of the present invention as defined in the appended claims.

What is claimed is:

1. A cooking appliance comprising:
   a housing;
   a lower platen mounted to said housing;
   a positioning mechanism mounted to said housing;
   an upper platen mounted to said positioning mechanism, said positioning mechanism being operable to move said upper platen between a cooking and a non-cooking position with respect to said lower platen; and
   a heating assembly for heating said lower platen, said heating assembly comprising a non-contact infrared heating element disposed within said heating assembly such that there is a space between said non-contact infrared heating element and said lower platen and such that said lower platen is substantially uniformly heated, wherein said infrared heating element emits radiation that is substantially in the wavelength range of about 900 to 4,000 nanometers.

2. The cooking appliance according to claim 1, wherein said heating assembly further comprises a cavity within said heating assembly and said infrared heating element is disposed in said cavity.

3. The cooking apparatus according to claim 2, wherein said heating assembly further comprises a metallic container and a thermal insulating material disposed in said container, wherein said insulating material is shaped to form said cavity, wherein said insulating material has a surface that faces said lower platen, and wherein said non-contact infrared heating element is disposed on top of said surface so that infrared radiation emitted by said non-contact infrared heating element uniformly heats said lower platen.

4. The cooking appliance according to claim 3, wherein said container is formed by a base and at least one wall.

5. The cooking appliance according to claim 3, wherein said container is formed by a base and four side walls.

6. The cooking appliance according to claim 5, and further comprising means for securing said heating assembly to an under side of said lower platen.

7. The cooking appliance according to claim 6, wherein said heating assembly further comprises means for applying electrical energy to said heating element to produce said emitted infrared radiation.

8. The cooking appliance according to claim 6, wherein said side walls form a top of said container, said insulating material extending above said top of the container to form a sealing surface, and said means for securing holds said sealing surface in sealed contact with said under side of said lower platen.

9. The cooking appliance according to claim 6 wherein said heating element is secured to said insulating material by staples.

10. The cooking appliance according to claim 6, wherein said heating element is arranged in a serpentine manner on said insulating material.

11. The cooking appliance according to claim 6, wherein said heating element is a coil.

12. The cooking appliance of claim 3, wherein said insulating material has a relatively high insulating factor so as to limit heat transfer through said metallic container and maximize heat transfer from said non-contact infrared heating element to said lower platen.

13. The cooking appliance according to claim 12, wherein said insulating material is microporous insulation.

14. The cooking appliance according to claim 3, wherein said heating assembly is attached to said lower platen so that said surface of said insulating material faces at least a portion of said lower platen, and wherein said non-contact infrared heating element is arranged in a pattern on said surface such that said portion of said lower platen is substantially uniformly heated by said infrared radiation.

15. A cooking appliance comprising:
   at least one platen for grilling food; and
   a heating assembly attached to said platen, said heating assembly having a container, an insulating material disposed in said container and a non-contact infrared heating element disposed on top of a surface of said insulating material such that said platen is substantially uniformly heated by infrared radiation emitted by said infrared heating element, and such that there is a space between said non-contact infrared heating element and said platen, and wherein said infrared radiation is substantially in the wavelength range of about 900 to 4,000 nanometers.

16. The cooking appliance according to claim 15, wherein said surface of said insulating material faces at least a portion of said platen, and wherein said non-contact infrared heating element is arranged in a pattern on said surface such that said portion of said platen is substantially uniformly heated by said infrared radiation.

* * * * *